US012791060B2

(12) United States Patent
Hatanaka et al.

(10) Patent No.: US 12,791,060 B2
(45) Date of Patent: Nov. 10, 2026

(54) AXLE ASSEMBLY AND OFF-ROAD VEHICLE

(71) Applicant: KAWASAKI MOTORS, LTD., Hyogo (JP)

(72) Inventors: Tatsuya Hatanaka, Akashi (JP); Yuta Ishibashi, Akashi (JP); Wataru Watanabe, Akashi (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 369 days.

(21) Appl. No.: 18/592,569

(22) Filed: Mar. 1, 2024

(65) Prior Publication Data

US 2025/0277513 A1 Sep. 4, 2025

(51) Int. Cl.
*F16C 33/80* (2006.01)
*F16C 33/32* (2006.01)

(52) U.S. Cl.
CPC ............ *F16C 33/805* (2013.01); *F16C 33/32* (2013.01); *F16C 2326/02* (2013.01); *F16C 2326/20* (2013.01)

(58) Field of Classification Search
CPC .... F16C 33/805; F16C 33/32; F16C 2326/02; F16C 2326/20; F16C 33/768; F16C 35/067
See application file for complete search history.

(56) References Cited

U.S. PATENT DOCUMENTS 3,913,992 A * 10/1975 Scott .................. F16C 33/7813 384/465
5,547,290 A * 8/1996 Ouchi ................ B60B 27/0005 324/207.25
5,762,425 A * 6/1998 Ouchi .................... G01P 3/487 324/207.25
5,984,422 A 11/1999 Seifert
7,909,517 B2 * 3/2011 Ohtsuki .............. B60B 27/0005 384/544
8,192,088 B2 * 6/2012 Ohtsuki .............. B60B 27/0026 384/544
10,215,282 B1 * 2/2019 Taylor .................. F16J 15/4476
2003/0098563 A1 * 5/2003 Hacker ................. F16C 19/364 280/93.512
2003/0103706 A1 * 6/2003 Hacker ................. F16C 19/386 384/589
2005/0104312 A1 * 5/2005 Durand .................... B62D 7/18 280/93.512
2007/0201782 A1 * 8/2007 Miyagawa .......... F16C 33/7879 277/351
2008/0297143 A1 * 12/2008 Tanaka .................... G01P 3/487 384/624
2013/0182985 A1 * 7/2013 Yokota .................... G01P 3/443 384/490

(Continued)

*Primary Examiner* — Jason D Shanske
*Assistant Examiner* — Shams Dhanani
(74) *Attorney, Agent, or Firm* — XSENSUS LLP

(57) ABSTRACT

An axle assembly 2: includes a hub bearing 3 in which an axle shaft 1 is inserted; a knuckle 4 including a shaft hole **4*a* extending in a direction of an axis C of the axle shaft 1 and housing the hub bearing 3, and a stopper 44 preventing the hub bearing 3 from moving inward in the direction of the axis C inside the shaft hole 4*a*; and a cover 5 that is attached to the knuckle 4 and pushes the hub bearing 3 against the stopper 44** from an outer side in the direction of the axis C.

19 Claims, 5 Drawing Sheets

(56) References Cited

U.S. PATENT DOCUMENTS

| | | | | |
|---|---|---|---|---|
| 2014/0265147 | A1* | 9/2014 | Majerik | B60B 35/02 277/412 |
| 2015/0176654 | A1* | 6/2015 | Back | F16C 33/7806 384/480 |
| 2018/0135700 | A1* | 5/2018 | Senda | F16J 15/3232 |
| 2018/0258995 | A1* | 9/2018 | Mitsuishi | F16C 33/7883 |
| 2023/0160432 | A1* | 5/2023 | Dittmar | F16C 33/805 384/477 |
| 2024/0301917 | A1* | 9/2024 | Fujita | F16J 15/3256 |

* cited by examiner

AXLE ASSEMBLY AND OFF-ROAD VEHICLE

FIELD

The technique disclosed here relates to an axle assembly and an off-road vehicle.

BACKGROUND

U.S. Pat. No. 5,984,422 discloses an axle assembly. The axle assembly includes a hub bearing in which an axle shaft is inserted, and a knuckle having a shaft hall extending in the direction of the axis of the axle shaft and housing the hub bearing. The hub bearing is attached to a hub attached to the axle shaft. A wheel and a brake disc are attached to the hub.

SUMMARY

During traveling of a vehicle, a shock applied from the road surface to a wheel can be exerted on an axle assembly through a hub. In view of this, the axle assembly is required to have a certain level of rigidity or higher.

It is therefore an object of the technique disclosed here to increase rigidity of an axle assembly.

An axle assembly disclosed here includes: a hub bearing in which an axle shaft is inserted; a knuckle including a shaft hole and a stopper, the shaft hole extending in a direction of an axis of the axle shaft and housing the hub bearing, the stopper preventing the hub bearing from moving inward in the direction of the axis inside the shaft hole; and a cover that is attached to the knuckle and pushes the hub bearing against the stopper from an outer side in the direction of the axis.

Another axle assembly disclosed here includes: a hub bearing in which an axle shaft is inserted; a knuckle including a shaft hole, the shaft hole extending in a direction of an axis of the axle shaft and housing the hub bearing; and a cover attached to an opening end of the shaft hole of the knuckle on an outer side in the direction of the axis, the cover having an annular shape surrounding the axis.

An off-road vehicle disclosed here includes: an axle shaft extending in a direction of an axis; hub bearing in which the axle shaft is inserted; a knuckle including a shaft hole and a stopper, the shaft hole extending in the direction of the axis and housing the hub bearing, the stopper preventing the hub bearing from moving inward in the direction of the axis inside the shaft hole; and a cover that is attached to the knuckle and pushes the hub bearing against the stopper from an outer side in the direction of the axis.

The axle assembly can increase rigidity.

The off-road vehicle can increase rigidity of the axle assembly.

DESCRIPTION OF EMBODIMENTS

Figure 1:
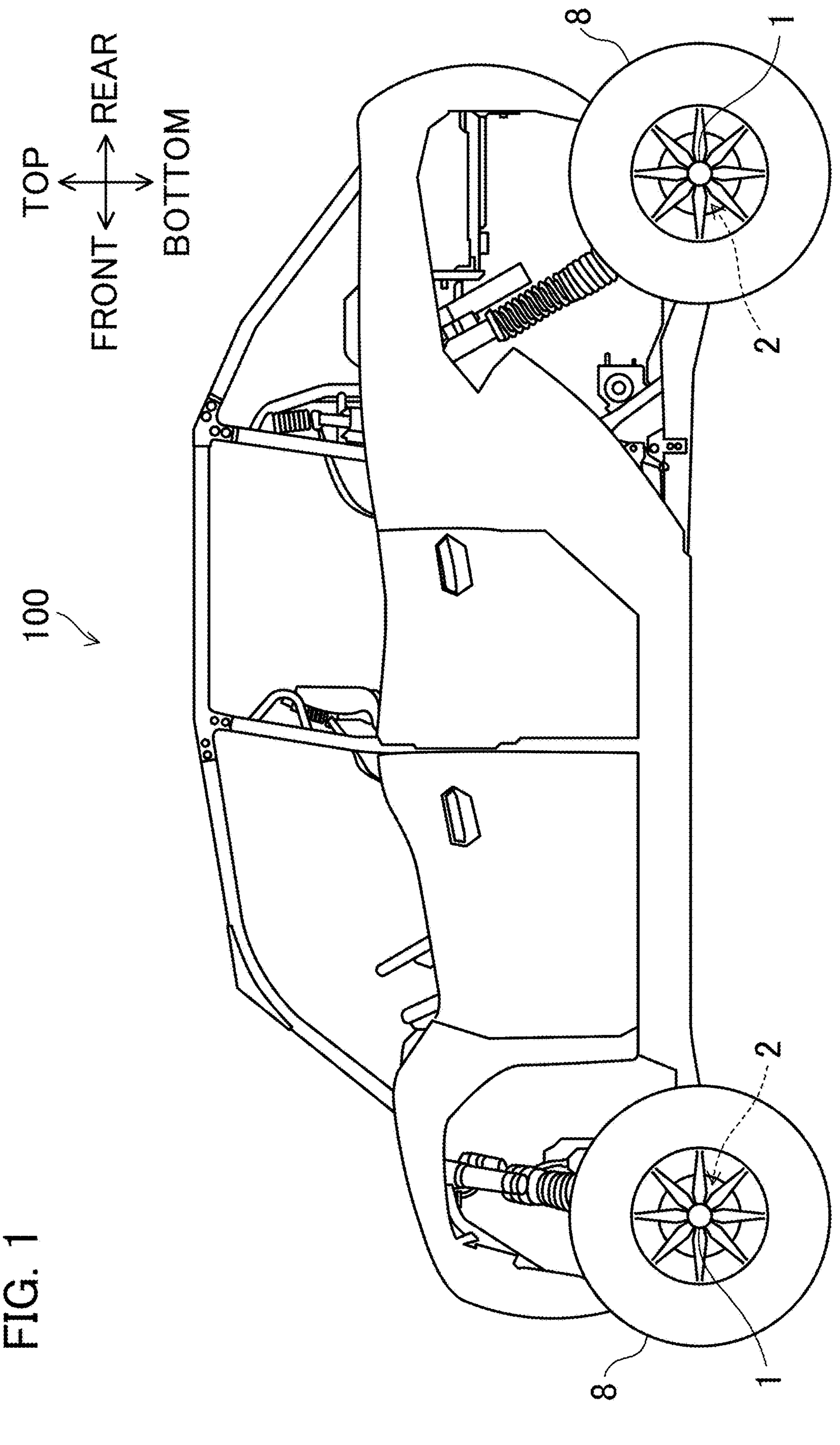
FIG. 1 is a side view of a utility vehicle.

An exemplary embodiment will be described in detail hereinafter with reference to the drawings. FIG. 1 is a side view of a utility vehicle 100. The utility vehicle 100 is a four-wheeled vehicle that can travel off-road. That is, the vehicle 100 includes two front wheels 8 and two rear wheels 8. The utility vehicle 100 is an example of an off-road vehicle. Hereinafter, the utility vehicle 100 will also be referred to simply as a "vehicle 100."

In the present disclosure, configurations of the vehicle 100 will be described with reference to directions of the vehicle 100. Specifically, "front" refers to the front of the vehicle 100 in the vehicle front-rear direction, and "rear" refers to the rear of the vehicle 100 in the vehicle front-rear direction. "Left" refers to the left of the vehicle 100 when seeing forward, and "right" refers to the right of the vehicle 100 when seeing forward. The left-right direction will be sometimes referred to as a "vehicle width direction."

Figure 2:
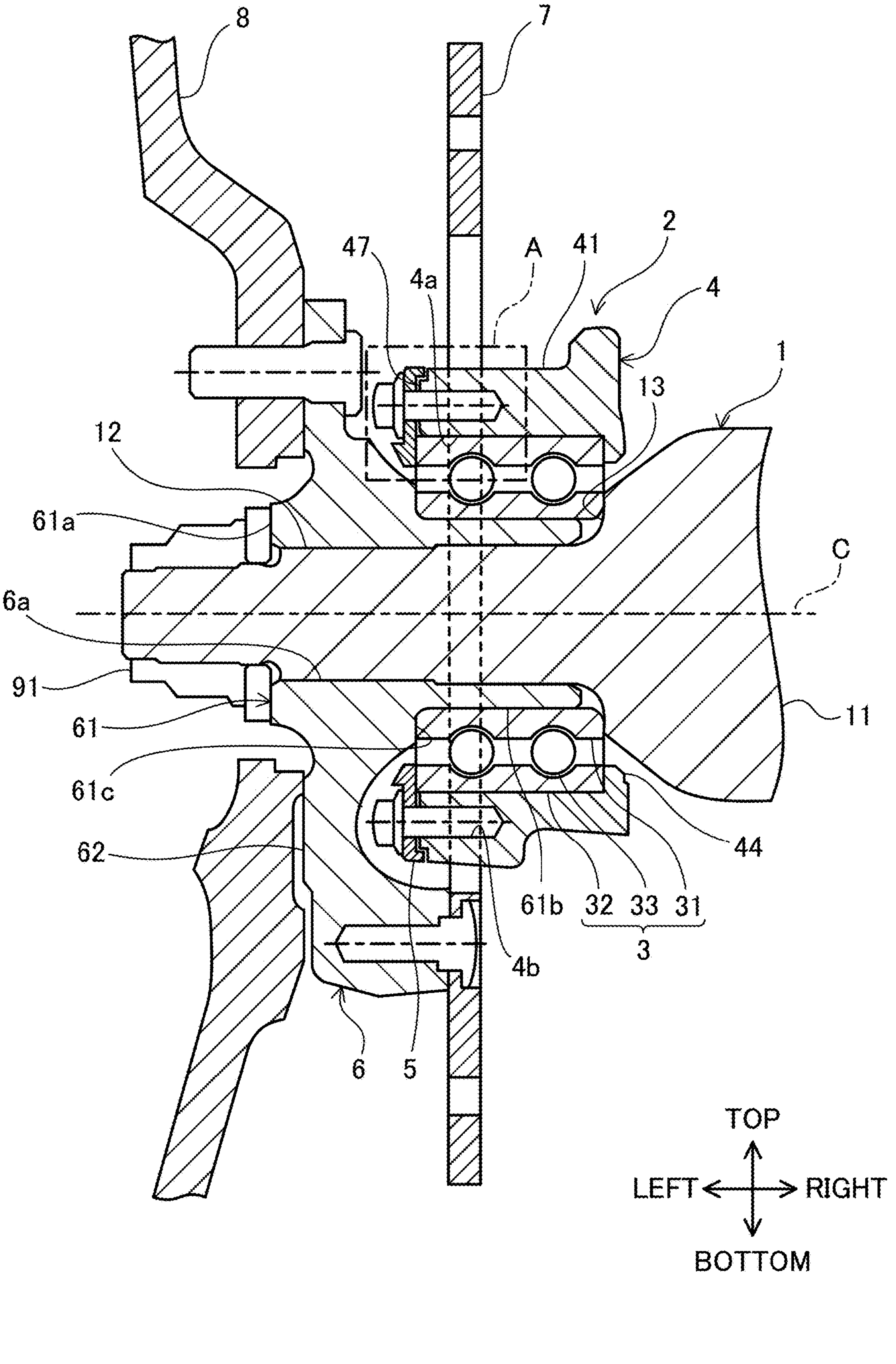
FIG. 2 is a cross-sectional view of an axle assembly.

FIG. 2 is a cross-sectional view of an axle assembly 2. Specifically, FIG. 2 is a cross-sectional view of the axle assembly 2 taken along a plane including an axis C of an axle shaft 1. The vehicle 100 includes the axle shafts 1 and the axle assemblies 2. The vehicle 100 may further include hubs 6 and brake disc 7. Each axle shaft 1 rotates about the axis C by a driving force of an engine. Each hub 6 is non-rotatably attached to the corresponding axle shaft 1. Both the wheel 8 and the brake disc 7 are non-rotatably attached to the hub 6. Accordingly, the wheels 8 rotate integrally with the hubs 6 and the axle shaft 1. That is, the wheels 8 are drive wheels. The axle assembly 2 is rotatably attached to the axle shaft 1 through the hub 6. A vehicle body of the vehicle 100 is coupled to the axle assemblies 2 through suspension arms and other members. That is, the axle assemblies 2 support the vehicle body of the vehicle 100 such that the vehicle body is rotatable about the axes C of the axle shafts 1.

In this example, the vehicle 100 includes a front axle shaft 1 supporting two front wheels 8 and a rear axle shaft 1 supporting two rear wheels 8. One axle assembly 2 is disposed for each wheel 8. That is, the vehicle 100 includes four axle assemblies 2.

Each axle shaft 1 extends in the direction of the axis C. Unless otherwise specified, the "axial direction" refers to the direction of the axis C, the "radial direction" refers to a radial direction about the axis C, and the "circumferential direction" refers to a circumferential direction about the axis C. The axial direction substantially coincides with the vehicle width direction. An outer side or outward in the axial direction corresponds to an outer side or outward in the vehicle width direction, and an inner side or inward in the axial direction corresponds to an inner side or inward in the vehicle width direction. The axle shaft 1 includes a body 11, an end portion 12 located outward of the body 11 in the axial direction and having a smaller diameter than that of the body 11, and a stepped surface 13 located at the boundary between the body 11 and the end portion 12 and facing outward in the axial direction. The end portion 12 has an external thread.

The hub 6 has an insertion hole **6*a* in which the axle shaft 1 is inserted in the axial direction. Specifically, the hub 6 includes a cylindrical base 61 extending in the axial direction, and an annular flange 62 expanding from the base 61 outward in the radial direction. A corresponding one of the wheels 8 described above is located outward of the flange 62 in the axial direction and non-rotatably attached to the flange 62. The brake disc 7 described above is located inward of the flange 62 in the axial direction and non-rotatably attached to the flange 62**.

The base 61 has the insertion hole **6*a* described above. The insertion hole 6*a* penetrates the base 61 in the axial direction. The axis of the insertion hole 6*a* coincides with the axis C. The flange 62 is coupled to the base 61 to surround the base 61. The axis of the flange 62 coincides with the axis C. The base 61 includes a first cylinder 61***a* including the flange 62, a second cylinder 61*b* located inward of the first cylinder 61*a* in the axial direction, and a stepped surface 61*c* located at the boundary between the first cylinder 61*a* and the second cylinder 61*b*. The first cylinder 61*a* is a portion of the base 61 that is not inserted in a hub bearing 3 described later. The second cylinder 61*b* is a portion of the base 61 that is inserted in the hub bearing 3. The outer diameter of the second cylinder 61*b* is smaller than the outer diameter of the first cylinder 61*a*. The stepped surface 61*c* faces inward in the axial direction.

Figure 3:
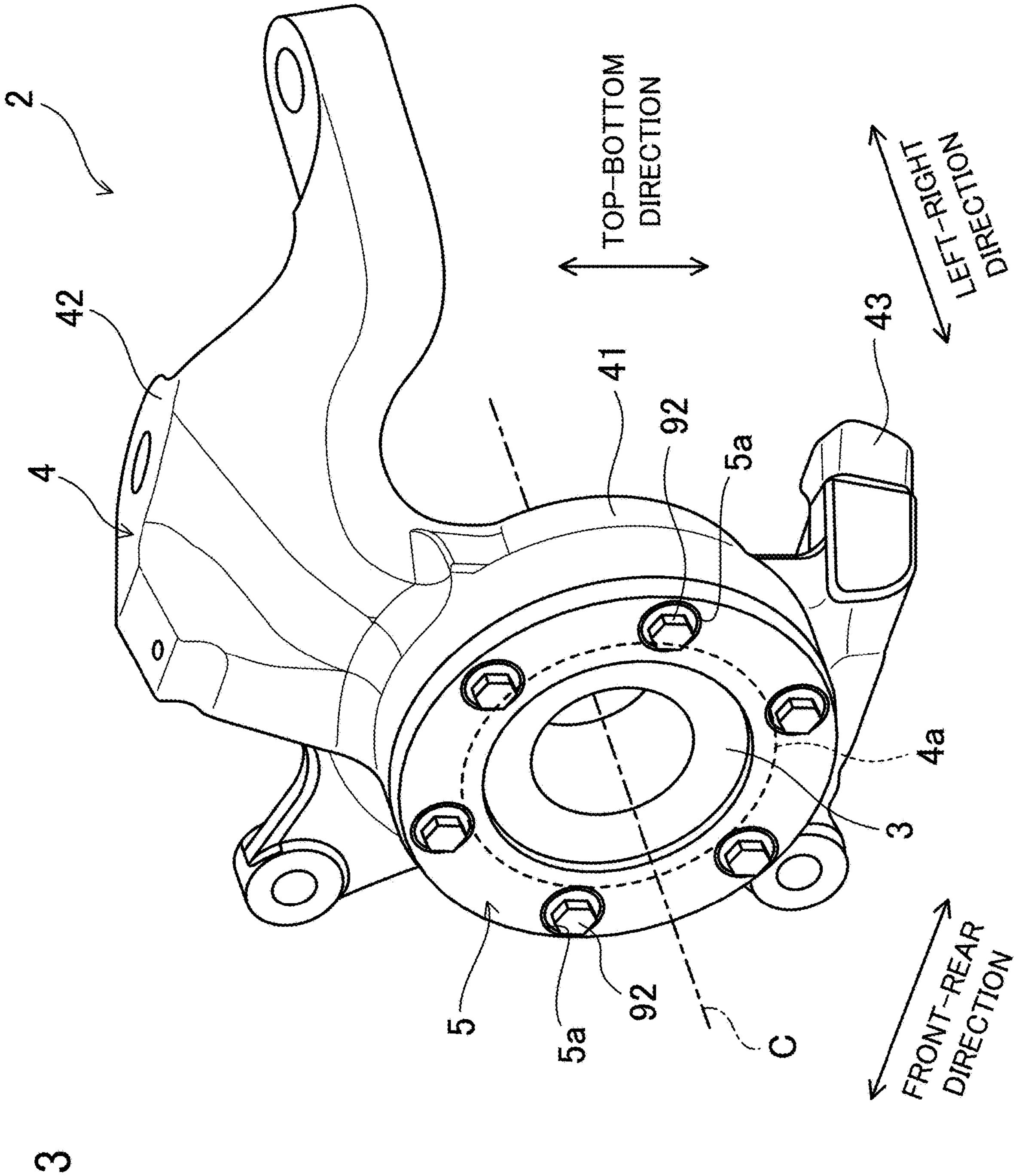
FIG. 3 is a perspective view of the axle assembly.

FIG. 3 is a perspective view of the axle assembly 2. The axle assembly 2 includes the hub bearing 3 in which the axle shaft 1 (see FIG. 2) is inserted, a knuckle 4 having a shaft hole 4*a* extending in the axial direction and housing the hub bearing 3, and a cover 5 attached to the knuckle 4. That is, the hub bearing 3 is located in the shaft hole 4*a* of the knuckle 4 and supported by the knuckle 4. Specifically, the hub bearing 3 is fitted in the shaft hole 4*a* of the knuckle 4 without a gap. For example, the hub bearing 3 is press fitted in the shaft hole 4*a* of the knuckle 4.

As illustrated in FIG. 2, the hub bearing 3 includes a cylindrical inner ring 31, a cylindrical outer ring 32 located outward of the inner ring 31 in the radial direction, and balls 33 located between the inner ring 31 and the outer ring 32. The axes of the inner ring 31 and the outer ring 32 coincide with the axis C. The outer ring 32 is rotatable about the axis C with respect to the inner ring 31 through the balls 33. The inner ring 31 is non-rotatably attached to the outer peripheral surface of the second cylinder 61*b* in the base 61 of the hub 6. That is, the inner ring 31 rotates integrally with the hub 6. The outer ring 32 is non-rotatably attached to the knuckle 4. Specifically, the outer peripheral surface of the outer ring 32 is non-rotatably attached to the inner peripheral surface of the shaft hole 4*a* of the knuckle 4. In addition, the inner end surface of the outer ring 32 in the axial direction is non-rotatably attached to the outer end surface of a stopper 44 described later of the knuckle 4 in the axial direction. That is, even when the axle shaft 1 rotates, the inner ring 31 rotates relatively to the outer ring 32, and thus, the knuckle 4 does not rotate.

The knuckle 4 supports the wheel 8 through the hub 6 and the hub bearing 3. As illustrated in FIG. 3, the knuckle 4 includes a cylindrical body 41 having the shaft hole 4*a*, an upper arm 42 coupled to an upper portion of the body 41, and a lower arm 43 coupled to a lower portion of the body 41. The axis of the shaft hole 4*a* coincides with the axis C. The body 41 includes an opening end 47 of the shaft hole 4*a* (see FIG. 2) on the outer side in the axial direction. The cover 5 is attached to the opening end 47. Each of the upper arm 42 and the lower arm 43 extends from the body 41 inward in the axial direction as a whole. The upper arm 42 and the lower arm 43 are supported by, for example, a suspension arm. As illustrated in FIG. 2, the body 41 further includes screw holes 4*b* for attaching the cover 5. In this example, the body 41 includes six screw holes 4*b*. The six screw holes 4*b* are arranged at regular intervals in the circumferential direction. The knuckle 4 is, for example, a casting.

The knuckle 4 includes the stopper 44 that prevents the hub bearing 3 from moving inward in the axial direction inside the shaft hole 4*a*. In this example, the stopper 44 projects inward in the radial direction from an inner end portion of the inner peripheral surface of the shaft hole 4*a* of the knuckle 4 in the axial direction. The length of projection of the stopper 44 from the inner peripheral surface of the shaft hole 4*a* is substantially equal to the thickness of the outer ring 32 of the hub bearing 3 in the radial direction, for example. The stopper 44 has an annular shape surrounding the axis C. Specifically, the stopper 44 has a disc shape about the axis C. An opening about the axis C is defined at the center of the stopper 44. The inner diameter of the stopper 44 is larger than the inner diameter of the hub bearing 3, that is, the outer diameter of the inner ring 31. That is, in the radial direction, the stopper 44 does not reach the inner ring 31.

Figure 4:
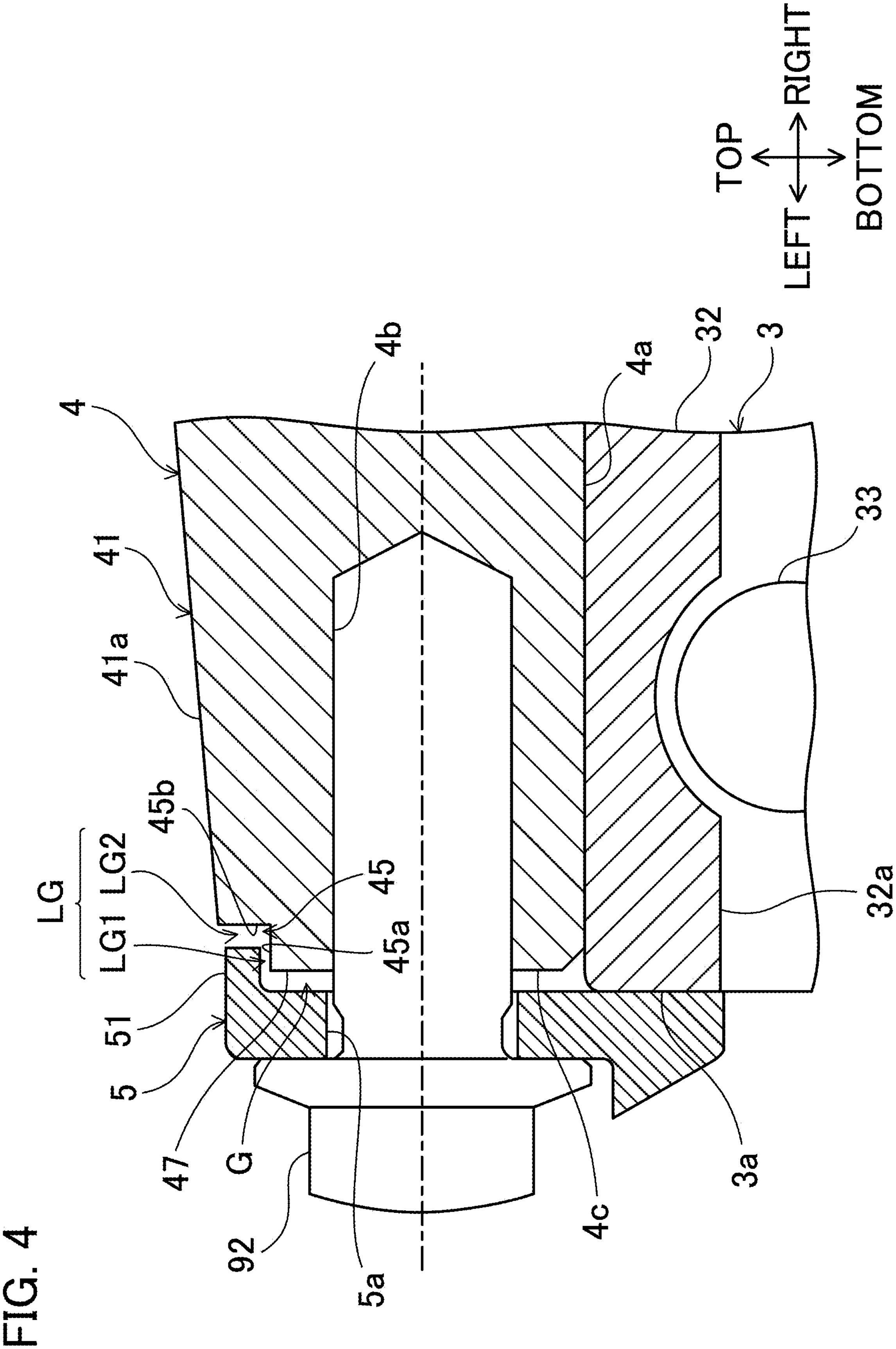
FIG. 4 is an enlarged view of a section A in FIG. 2.

FIG. 4 is an enlarged view of a section A in FIG. 2. The knuckle 4 has an opposed surface 4*c* facing the cover 5 in the axial direction. The opposed surface 4*c* is at least a part of the opening end 47 of the knuckle 4. The cover 5 is attached to the opposed surface 4*c*. The opposed surface 4*c* is located at the outer end of the body 41 in the axial direction. The opposed surface 4*c* is an annular surface that faces outward in the axial direction and surrounds the axis C. Specifically, the opposed surface 4*c* is an annular flat surface about the axis C. More specifically, the opposed surface 4*c* is a flat surface orthogonal to the axis C. The screw holes 4*b* described above are arranged in the opposed surface 4*c*.

The cover 5 increases rigidity in attaching the hub bearing 3 to the knuckle 4. Specifically, the cover 5 pushes the hub bearing 3 to the stopper 44 of the knuckle 4 (see FIG. 2) from the outer side in the axial direction. Accordingly, rattles of the hub bearing 3 to the knuckle 4 in the axial direction are reduced. In this example, the cover 5 also increases rigidity of the knuckle 4 as well as attachment rigidity of the hub bearing 3.

The cover 5 is attached to the knuckle 4 while facing the opposed surface 4*c*. The cover 5 projects inward in the radial direction from the inner peripheral surface of the shaft hole 4*a*. Specifically, the cover 5 reaches the outer ring 32 of the hub bearing 3 and does not reach the inner ring 31 (see FIG. 2) in the radial direction. The cover 5 is in contact with the hub bearing 3 (specifically the outer ring 32). More specifically, the cover 5 is in contact with the hub bearing 3 from the outer side in the radial direction. In other words, the hub bearing 3 has a contact surface 3*a* with which the cover 5 is in contact. In this state, the cover 5 applies a pressing force to the hub bearing 3 to the inner side in the axial direction. That is, a pressing force from the cover 5 is exerted on the contact surface 3*a* of the hub bearing 3.

Specifically, as illustrated in FIG. 3, the cover 5 has an annular shape surrounding the axle shaft 1 (see FIG. 2). More specifically, the cover 5 has a disc shape having an opening at the center. The axis of the cover 5 coincides with the axis C. In this example, the cover 5 is a forging.

The cover 5 has through holes 5*a* in which bolts 92 are inserted. The bolts 92 are, for example, micro encapsulated bolts. In this example, the cover 5 has six through holes 5*a*. Each of the through holes 5*a* penetrates the cover 5 in the thickness direction. The six through holes 5*a* are arranged at regular intervals in the circumferential direction. The position of each through hole Sa in the circumferential direction coincides with the position of a corresponding one of the six screw holes 4*b* (see FIG. 2) of the knuckle 4 in the circumferential direction. As illustrated in FIG. 4, the cover 5 is bolted on the opposed surface 4*c* of the knuckle 4. Specifically, the bolts 92 are inserted in the through holes 5*a* and screwed to the screw holes 4*b* so that the cover 5 is thereby bolted on the opposed surface 4*c*.

More specifically, a gap G in the axial direction is defined between the cover 5 and the knuckle 4. Specifically, the gap G is defined between the cover 5 and the opposed surface 4*c* of the knuckle 4. That is, the cover 5 is separated from the opposed surface 4c of the knuckle 4 in the axial direction. The cover 5 is not in contact with the opposed surface 4c of the knuckle 4. In this example, in regard to the position in the axial direction, the contact surface 3a of the hub bearing 3 is located outward of the opposed surface 4c of the knuckle 4 in the axial direction.

In this example, a labyrinth gap LG is defined between the cover 5 and the knuckle 4. The labyrinth gap LG extends while bending. The "bending" includes not only a case where the labyrinth gap LG bends at a bend angle of 90 degrees, but also a case where the labyrinth gap LG bends at a bend angle less than 90 degrees or greater than 90 degrees. The bend angle refers to an angle formed by two adjacent portions sandwiching a bending portion of the labyrinth gap LG. Specifically, the labyrinth gap LG is connected to the gap G. The labyrinth gap LG is located outward of the gap G in the radial direction. More specifically, the labyrinth gap LG is located outward of the opposed surface 4c of the knuckle 4 in the radial direction. The labyrinth gap LG is an uneven gap having a labyrinth shape. Specifically, the labyrinth gap LG is an axial labyrinth. Specifically, the labyrinth gap LG includes a first labyrinth gap LG1 extending in the axial direction and a second labyrinth gap LG2 extending in the radial direction. That is, in this example, the labyrinth gap LG bends substantially at a bend angle of 90 degrees. The inner end of the first labyrinth gap LG1 in the axial direction is connected to the inner end of the second labyrinth gap LG2 in the radial direction. The outer end of the first labyrinth gap LG1 in the axial direction is connected to the outer end of the gap G in the radial direction. The outer end of the second labyrinth gap LG2 in the radial direction is exposed to the outside of the axle assembly 2.

Specifically, the knuckle 4 has a recess 45 located outward of the opposed surface 4c in the radial direction and recessed inward in the axial direction. More specifically, the recess 45 is defined by a first surface 45a facing outward in the radial direction and a second surface 45b facing outward in the axial direction. The inner end of the first surface 45a in the axial direction is coupled to the inner end of the second surface 45b in the radial direction. The outer end of the first surface 45a in the axial direction is coupled to the outer end of the opposed surface 4c in the radial direction. The outer end of the second surface 45b in the radial direction is coupled to the outer end of an outer peripheral surface 41a in the axial direction in the body 41 of the knuckle 4. The cover 5 has a projection 51 projecting inward in the axial direction and entering the recess 45. The projection 51 is located at an outer end portion in the radial direction in the inner end surface of the cover 5 in the axial direction. A space between the projection 51 and the recess 45 is the labyrinth gap LG.

In regard to a structure of attaching the hub bearing 3 to the knuckle 4, the cover 5 is in contact with the contact surface 3a of the hub bearing 3, and the gap G is defined between the cover 5 and the opposed surface 4c of the knuckle 4, as described above. The bolts 92 inserted in the through holes 5a of the cover 5 are screwed to the screw holes 4b of the knuckle 4. When the bolts 92 are tightened, the cover 5 is pushed against the contact surface 3a, and the hub bearing 3 is pushed against the stopper 44 of the knuckle 4 (see FIG. 2). In this state, the hub bearing 3 is firmly fixed to the knuckle 4. That is, in this example, the cover 5 firmly unites the hub bearing 3, the knuckle 4, and the cover 5, that is, the axle assembly 2.

In regard to attachment of the hub 6 and the axle assembly 2 to the axle shaft 1, the axle shaft 1 is fitted in the insertion hole 6a of the hub 6 without a gap, as illustrated in FIG. 2. For example, the axle shaft 1 is press fitted in the insertion hole 6a. Specifically, the end portion 12 of the axle shaft 1 is inserted in the insertion hole 6a. The end portion 12 penetrates the base 61 of the hub 6 through the insertion hole 6a. A nut 91 is screwed to a portion of the end portion 12 projecting from the insertion hole 6a. The hub 6 is fixed to the axle shaft 1 by tightening the nut 91. More specifically, the hub bearing 3 is located on the outer peripheral surface of the second cylinder 61b of the base 61 of the hub 6. An end of the inner ring 31 of the hub bearing 3 in the axial direction is in contact with the stepped surface 61c of the hub 6. The other end of the inner ring 31 in the axial direction is in contact with the stepped surface 13 of the axle shaft 1. When the nut 91 is tightened, the hub 6 is pushed against the hub bearing 3, and the hub bearing 3 is pushed against the stepped surface 13 of the axle shaft 1. In this state, the hub 6 and the hub bearing 3 are fixed to the axle shaft 1.

In regard to braking of the wheel 8, the brake disc 7 and the wheel 8 are non-rotatably attached to the flange 62 of the hub 6, as described above. When a pair of brake pads sandwiches the brake disc 7 to brake the brake disc 7, the wheel 8 is also braked through the hub 6.

In the thus-configured axle assembly 2, the cover 5 is attached to the knuckle 4, and the cover 5 pushes the hub bearing 3 against the stopper 44 of the knuckle 4 from the outer side in the axial direction. Accordingly, the knuckle 4 is firmly united with the hub bearing 3, and as compared to a case where the hub bearing 3 is simply fitted in the knuckle 4, for example, rigidity in attaching the hub bearing 3 to the knuckle 4 can be increased. As a result, rigidity of the axle assembly 2 can be increased.

In particular, in this example, since the cover 5 has the annular shape surrounding the axle shaft 1, the cover 5 pushes the entire hub bearing 3 in the circumferential direction against the stopper 44 of the knuckle 4 from the outer side in the axial direction. Accordingly, as compared to a case where the cover 5 pushes a part of the hub bearing 3 in the circumferential direction against the stopper 44 of the knuckle 4 from the outer side in the axial direction, for example, rigidity in attaching the hub bearing 3 to the knuckle 4 can be increased.

The hub bearing 3 has the contact surface 3a which contacts the cover 5 and on which the pressing force from the cover 5 is exerted, and the gap G in the axial direction is defined between the cover 5 and the opposed surface 4c of the knuckle 4. Accordingly, it is possible to prevent the pressing force of the cover 5 from dispersing on the opposed surface 4c, thereby ensuring exertion of the pressing force of the cover 5 on the hub bearing 3. For example, as compared to a case where the cover 5 is in contact with the opposed surface 4c, the pressing force exerted on the hub bearing 3 from the cover 5 can be increased. As a result, the knuckle 4 is more firmly united with the hub bearing 3 so that rigidity in attaching the hub bearing 3 to the knuckle 4 can be thereby further increased. In this example, in regard to the position in the axial direction, the contact surface 3a is located outward of the opposed surface 4c in the axial direction. Accordingly, even in a case where the surface of the cover 5 facing the contact surface 3a and the opposed surface 4c is flat, the cover 5 can be brought into contact with the contact surface 3a with the gap G kept between the cover 5 and the opposed surface 4c. That is, the configuration having the gap G described above can be easily achieved without the cover 5 having a complicated shape.

In a case where the gap G is defined between the cover 5 and the opposed surface 4*c* of the knuckle 4, mud or other substances might enter the gap G from the outer side of the knuckle 4 in the radial direction to corrode the bolts 92 and other components. In this example, the labyrinth gap LG located outward of the gap G in the radial direction is defined between the cover 5 and the knuckle 4. Thus, mud or other substances do not easily enter the gap G.

In addition, since the cover 5 is a forging, the possibility of occurrence of a blow hole in the cover 5 can be reduced. Accordingly, the possibility of occurrence of a crack or other troubles in the cover 5 can be reduced.

Figure 5:
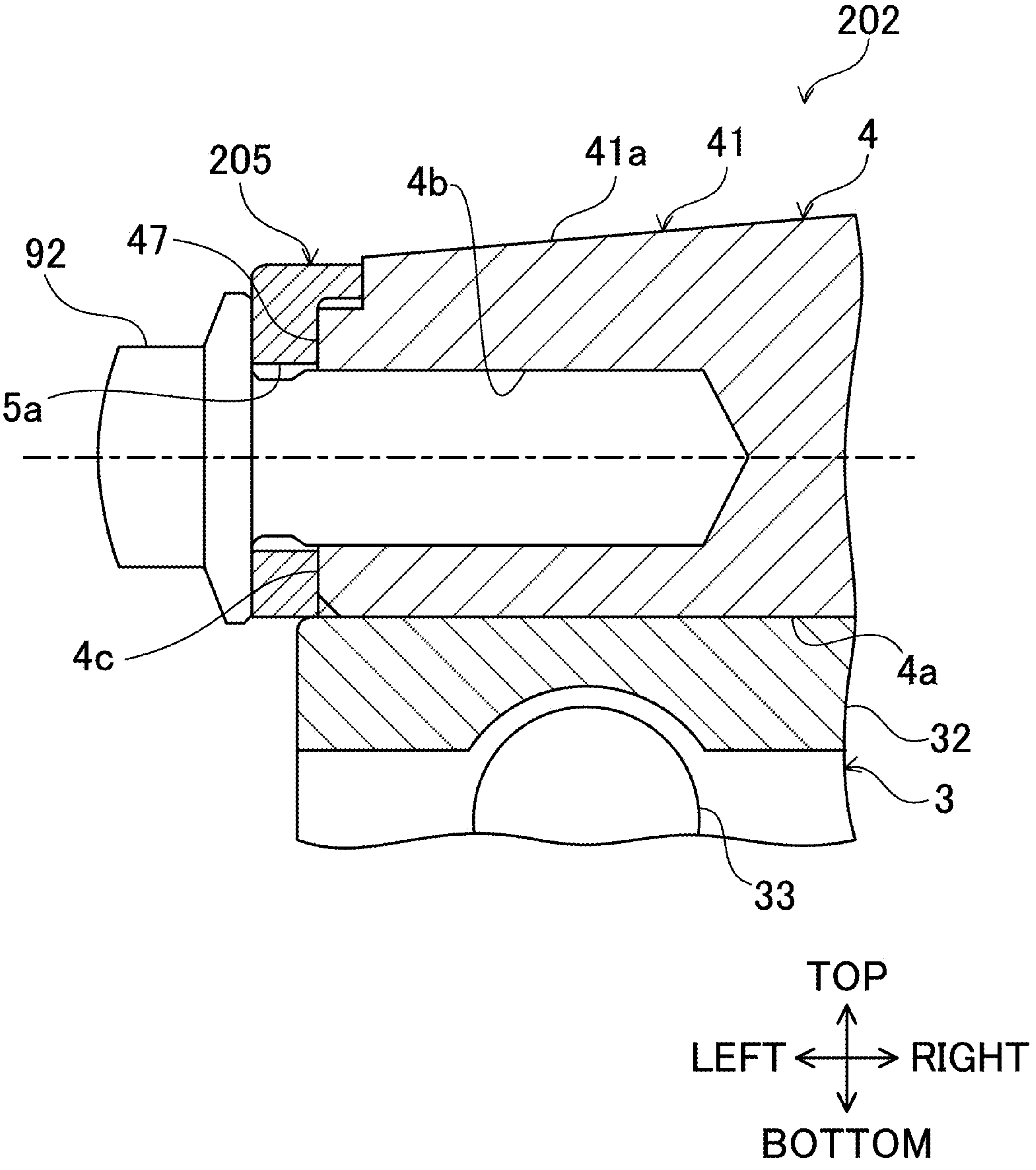
FIG. 5 is a cross-sectional view of an axle assembly according to a variation.

Next, an axle assembly 202 according to a variation will be described. FIG. 5 is a cross-sectional view of the axle assembly 202 according to the variation. FIG. 5 corresponds to FIG. 4. The axle assembly 202 is different from the axle assembly 2 in the shape of a cover 205 and the structure for attaching the cover 205 to a knuckle 4. The other components are the same as those of the axle assembly 2, and are denoted by the same reference characters as those of the axle assembly 2 and will not be described below.

The cover 205 is attached to an outer opening end 47 of a shaft hole 4*a* of a knuckle 4 in the axial direction. The cover 205 has an annular shape surrounding an axle shaft 1 (see FIG. 2). Specifically, the cover 205 extends from generally the position of an outer peripheral surface 41*a* of a body 41 of the knuckle 4 to generally the position of the inner peripheral surface of the shaft hole 4*a* of the knuckle 4 in the radial direction. That is, in this example, the cover 205 is not in contact with a hub bearing 3 and does not push the hub bearing 3 against a stopper 44 (see FIG. 2) of the knuckle 4. The cover 205 is in contact with an opposed surface 4*c* of the knuckle 4. That is, in this example, no gap G is defined between the cover 205 and the opposed surface 4*c* of the knuckle 4. Bolts 92 push the cover 205 against the opposed surface 4*c* of the knuckle 4.

In this axle assembly 202, since the annular cover 205 is attached to the opening end 47 of the knuckle 4, rigidity of the knuckle 4 itself can be increased. As a result, rigidity of the axle assembly 202 can be increased. Specifically, the outer opening end 47 of the knuckle 4 in the axial direction is more greatly shaken by an impact from the road surface than the inner opening end of the knuckle 4 in the axial direction, and thus, the cover 205 attached to the opening end 47 can effectively increase rigidity of the knuckle 4 itself.

Other Embodiments

In the foregoing section, the embodiment has been described as an example of the technique disclosed in the present application. The technique disclosed here, however, is not limited to this embodiment, and is applicable to other embodiments obtained by changes, replacements, additions, and/or omissions as necessary. Components described in the above embodiment may be combined as a new exemplary embodiment. Components provided in the accompanying drawings and the detailed description can include components unnecessary for solving problems as well as components necessary for solving problems in order to exemplify the technique. Therefore, it should not be concluded that such unnecessary components are necessary only because these unnecessary components are included in the accompanying drawings or the detailed description.

For example, the off-road vehicle is not limited to the utility vehicle 100. The off-road vehicle may be, for example, an all terrain vehicle (ATV), a tractor, or other vehicles. The off-road vehicle is not limited to the four-wheeled vehicle, and may be a three-wheeled vehicle, for example.

The configuration of the hub bearing 3 is not limited to the configuration illustrated in FIG. 2. For example, the number of balls 33 of the hub bearing 3 may be three or more.

The configuration of the knuckle 4 is not limited to the configuration illustrated in FIG. 2. As long as it is possible to prevent the hub bearing 3 from moving inward in the axial direction inside the shaft hole 4*a*, the shape, arrangement, and so forth of the stopper 44 of the knuckle 4 are not limited. In the axle assembly 202 according to the variation, the knuckle 4 may not include the stopper 44.

In the axle assembly 2, the cover 5 may not have the annular shape as long as the cover 5 can push the hub bearing 3 against the stopper 44 of the knuckle 4 from the outer side in the axial direction. For example, the outer shape of the cover 5 may be a polygon or a curved shape other than a circle. For example, the cover 5 may be divided in the circumferential direction.

In the axle assembly 2, no gap G may be defined between the cover 5 and the opposed surface 4*c* of the knuckle 4. That is, the cover 5 may be in contact with the opposed surface 4*c* of the knuckle 4. In this case, the opposed surface 4*c* of the knuckle 4 and the contact surface 3*a* of the hub bearing 3 may be located on the same plane.

In the axle assembly 2, in regard to the position in the axial direction, the contact surface 3*a* of the hub bearing 3 may be located inward of the opposed surface 4*c* of the knuckle 4 in the axial direction. In this case, the inner end of the cover 5 in the radial direction may bend inward in the axial direction such that the gap G is defined between the cover 5 and the opposed surface 4*c*.

The labyrinth gap LG may bend at a bend angle less than 90 degrees or a bend angle exceeding 90 degrees. In the axle assembly 2, the knuckle 4 may include a projection located outward of the opposed surface 4*c* in the radial direction and projecting outward in the axial direction, instead of the recess 45. The cover 5 may include a recess which is recessed outward in the axial direction and in which the projection of the knuckle 4 enters, instead of the projection 51. A space between the projection of the knuckle 4 and the recess of the cover 5 may be the labyrinth gap LG. An inner end surface of the cover 5 in the axial direction may be flat. Similarly, an outer end surface of the body 41 of the knuckle 4 in the axial direction may be flat. In this case, a space between the inner end surface of the cover 5 in the axial direction and the outer end surface of the body 41 of the knuckle 4 in the axial direction may not include the labyrinth gap LG.

The cover 5 may not be a forging. For example, the cover 5 may be a casting.

ASPECTS

The embodiment described above are a specific example of the following aspects.

(Aspect 1) An axle assembly 2 includes: a hub bearing 3 in which an axle shaft 1 is inserted; a knuckle 4 including a shaft hole 4*a* and a stopper 44, the shaft hole 4*a* extending in a direction of an axis C of the axle shaft 1 and housing the hub bearing 3, the stopper 44 preventing the hub bearing 3 from moving inward in the direction of the axis C inside the shaft hole 4*a*; and a cover 5 that is attached to the knuckle 4 and pushes the hub bearing 3 against the stopper 44 from an outer side in the direction of the axis C.

In this configuration, the cover 5 is attached to the knuckle 4, and the cover 5 pushes the hub bearing 3 against the stopper 44 of the knuckle 4 from the outer side in the axial direction. Accordingly, the knuckle 4 is firmly united with the hub bearing 3, and rigidity in attaching the hub bearing 3 to the knuckle 4 can be increased as compared to a case where the hub bearing 3 is simply fitted in the knuckle 4, for example. As a result, rigidity of the axle assembly 2 can be increased.

(Aspect 2) In the axle assembly 2 of aspect 1, the cover 5 has an annular shape surrounding the axle shaft 1.

In this configuration, the cover 5 pushes the entire hub bearing 3 in the circumferential direction against the stopper 44 of the knuckle 4 from the outer side in the axial direction. Accordingly, as compared to a case where the cover 5 pushes a part of the hub bearing 3 in the circumferential direction against the stopper 44 of the knuckle 4 from the outer side in the axial direction, for example, rigidity in attaching the hub bearing 3 to the knuckle 4 can be increased.

(Aspect 3) In the axle assembly 2 of aspect 1 or 2, the cover 5 contacts the hub bearing 3 from the outer side in the direction of the axis, and a gap G in the direction of the axis is defined between the cover 5 and the knuckle 4.

This configuration ensures exertion of a pressing force of the cover 5 on the hub bearing 3. Thus, the knuckle 4 can be more firmly united with the hub bearing 3, and rigidity in attaching the hub bearing 3 to the knuckle 4 can be further increased.

(Aspect 4) In the axle assembly 2 of any one of aspects 1 to 3, a labyrinth gap LG extending while bending is defined between the cover 5 and the knuckle 4.

In a case where the gap G is defined between the cover 5 and the knuckle 4, mud or other substances might enter the gap G from the outer side of the knuckle 4 in the radial direction to corrode the inside of the gap G. In this configuration, since the labyrinth gap LG is defined between the cover 5 and the knuckle 4, mud or other substances do not easily enter the inside of the bending portion of the labyrinth gap Lg in the radial direction.

(Aspect 5) In the axle assembly 2 of any one of aspects 1 to 4, the labyrinth gap LG is connected to the gap G, and located outward of the gap G in a radial direction about the axis C.

In this configuration, since the labyrinth gap LG located outward of the gap G in the radial direction is defined between the cover 5 and the knuckle 4, mud or other substances do not easily enter the gap G effectively.

(Aspect 6) In the axle assembly 2 of any one of aspects 1 to 5, wherein the knuckle 4 includes an opposed surface 4*c* facing the cover 5 in the direction of the axis C, and the gap G is defined between the cover 5 and the opposed surface 4*c*.

This configuration prevents a pressing force of the cover 5 from dispersing on the opposed surface 4*c*, thereby ensuring exertion of the pressing force of the cover 5 on the hub bearing 3. As a result, the knuckle 4 is more firmly united with the hub bearing 3 so that rigidity in attaching the hub bearing 3 to the knuckle 4 can be thereby further increased.

(Aspect 7) In the axle assembly 2 of any one of aspects 1 to 6, the hub bearing 3 includes a contact surface 3*a* which contacts the cover 5 and on which a pressing force of the cover 5 is exerted, and in regard to a position in the direction of the axis C, the contact surface 3*a* is located outward of the opposed surface 4*c* in the direction of the axis C.

With this configuration, even in a case where a surface of the cover 5 facing the contact surface 3*a* and the opposed surface 4*c* is flat, the cover 5 can be brought into contact with the contact surface 3*a* with the gap G kept between the cover 5 and the opposed surface 4*c*. That is, the configuration having the gap G described above can be easily achieved without the cover 5 having a complicated shape.

(Aspect 8) In the axle assembly 2 of any one of aspects 1 to 7, a labyrinth gap LG extending while bending is defined between the cover 5 and the knuckle 4, the labyrinth gap LG being connected to the gap G and located outward of the opposed surface 4*c* in a radial direction about the axis C.

In the case where the gap G is defined between the cover 5 and the opposed surface 4*c* of the knuckle 4, mud or other substances might enter the gap G from the outer side of the knuckle 4 in the radial direction to corrode the bolts 92 and other components attached to the opposed surface 4*c*. In this configuration, since the labyrinth gap LG located outward of the opposed surface 4*c* in the radial direction is defined between the cover 5 and the knuckle 4, mud or other substances do not easily enter the opposed surface 4*c*.

(Aspect 9) In the axle assembly 2 of any one of aspects 1 to 8, the knuckle 4 includes a recess 45 located outward of the opposed surface 4*c* in a radial direction about the axis C and recessed inward in the direction of the axis C, the cover 5 includes a projection 51 projecting inward in the direction of the axis C and entering the recess 45, and a space between the projection 51 and the recess 45 is the labyrinth gap LG.

This configuration achieves the axle assembly 2 including the labyrinth gap LG between the cover 5 and the knuckle 4.

(Aspect 10) In the axle assembly 2 of any one of aspects 1 to 9, the cover 5 is a forging.

This configuration can reduce the possibility of occurrence of a blow hole in the cover 5. Accordingly, the possibility of occurrence of a crack or other troubles in the cover 5 can be reduced.

(Aspect 11) An axle assembly 202 includes: a hub bearing 3 in which an axle shaft 1 is inserted; a knuckle 4 including a shaft hole 4*a*, the shaft hole 4*a* extending in a direction of an axis C of the axle shaft 1 and housing the hub bearing 3; and a cover 205 attached to an opening end 47 of the shaft hole 4*a* of the knuckle 4 on an outer side in the direction of the axis C, the cover 205 surrounding the axle shaft 1.

In this configuration, since the annular cover 205 is attached to the opening end 47 of the knuckle 4, rigidity of the knuckle 4 itself can be increased. As a result, rigidity of the axle assembly 202 can be increased. Specifically, the outer opening end 47 of the knuckle 4 in the axial direction is more greatly shaken by an impact from the road surface than the inner opening end of the knuckle 4 in the axial direction, and thus, the cover 205 attached to the opening end 47 can effectively increase rigidity of the knuckle 4 itself.

(Aspect 12) A utility vehicle 100 (off-road vehicle) includes: an axle shaft 1 extending in a direction of an axis C; a hub bearing 3 in which the axle shaft 1 is inserted; a knuckle 4 including a shaft hole 4*a* and a stopper 44, the shaft hole 4*a* extending in the direction of the axis C and housing the hub bearing 3, the stopper 44 preventing the hub bearing 3 from moving inward in the direction of the axis C inside the shaft hole 4*a*; and a cover 5 that is attached to the knuckle 4 and pushes the hub bearing 3 against the stopper 44 from an outer side in the direction of the axis C.

This configuration achieves the utility vehicle 100 with increased rigidity in attaching the hub bearing 3 to the knuckle 4.

What is claimed:

1. An axle assembly comprising:
a hub bearing in which an axle shaft is inserted;
a knuckle including a shaft hole and a stopper, the shaft hole extending in a direction of an axis of the axle shaft and housing the hub bearing, the stopper preventing the hub bearing from moving inward in the direction of the axis inside the shaft hole; and
a cover that is attached to the knuckle and pushes the hub bearing against the stopper from an outer side in the direction of the axis, wherein
the cover contacts the hub bearing from the outer side in the direction of the axis, and
a gap in the direction of the axis is defined between the cover and the knuckle.

2. The axle assembly according to claim 1, wherein
the cover has an annular shape surrounding the axis.

3. The axle assembly according to claim 1, wherein
a labyrinth gap extending while bending is defined between the cover and the knuckle.

4. The axle assembly according to claim 3, wherein
the labyrinth gap is connected to the gap, and located outward of the gap in a radial direction about the axis.

5. The axle assembly according to claim 1, wherein
the knuckle includes an opposed surface facing the cover in the direction of the axis, and
the gap is defined between the cover and the opposed surface.

6. The axle assembly according to claim 5, wherein
the hub bearing includes a contact surface which contacts the cover and on which a pressing force from the cover is exerted, and
in regard to a position in the direction of the axis, the contact surface is located outward of the opposed surface in the direction of the axis.

7. The axle assembly according to claim 5, wherein
a labyrinth gap extending while bending is defined between the cover and the knuckle, the labyrinth gap being connected to the gap and located outward of the opposed surface in a radial direction about the axis.

8. The axle assembly according to claim 7, wherein
the knuckle includes a recess located outward of the opposed surface in the radial direction about the axis and recessed inward in the direction of the axis,
the cover includes a projection projecting inward in the direction of the axis and entering the recess, and
a space between the projection and the recess is the labyrinth gap.

9. The axle assembly according to claim 1, wherein
the cover is a forging.

10. An off-road vehicle comprising:
an axle shaft extending in a direction of an axis;
a hub bearing in which the axle shaft is inserted;
a knuckle including a shaft hole and a stopper, the shaft hole extending in the direction of the axis and housing the hub bearing, the stopper preventing the hub bearing from moving inward in the direction of the axis inside the shaft hole; and
a cover that is attached to the knuckle and pushes the hub bearing against the stopper from an outer side in the direction of the axis, wherein
the cover contacts the hub bearing from the outer side in the direction of the axis, and
a gap in the direction of the axis is defined between the cover and the knuckle.

11. The axle assembly according to claim 1, wherein
the hub bearing includes an inner ring, an outer ring located outward of the inner ring in a radial direction about the axis, and a plurality of balls located between the inner ring and the outer ring, and
the cover contacts the outer ring from an outer side in the radial direction.

12. The axle assembly according to claim 11, wherein
an inner diameter of the stopper is larger than an outer diameter of the inner ring such that the stopper does not reach the inner ring in the radial direction.

13. The axle assembly according to claim 11, wherein
the stopper projects inward in the radial direction from an inner end portion of an inner peripheral surface of the shaft hole, and a length of projection of the stopper from the inner peripheral surface is substantially equal to a thickness of the outer ring in the radial direction.

14. The axle assembly according to claim 1, wherein
the stopper has an annular shape surrounding the axis.

15. The axle assembly according to claim 1, wherein
the knuckle includes a cylindrical body having the shaft hole, an upper arm coupled to an upper portion of the body, and a lower arm coupled to a lower portion of the body.

16. The axle assembly according to claim 1, wherein
the knuckle is a casting.

17. The axle assembly according to claim 5, wherein
the cover has a through hole, the knuckle has a screw hole arranged in the opposed surface, and a bolt inserted in the through hole and screwed to the screw hole bolts the cover on the opposed surface.

18. The axle assembly according to claim 3, wherein
the labyrinth gap includes a first labyrinth gap extending in the direction of the axis and a second labyrinth gap extending in a radial direction about the axis.

19. The axle assembly according to claim 5, wherein
a labyrinth gap extending while bending is defined between the cover and the knuckle, the labyrinth gap being connected to the gap and located outward of the opposed surface in a radial direction about the axis,
the knuckle includes a recess located outward of the opposed surface in the radial direction and recessed inward in the direction of the axis,
the cover includes a projection projecting inward in the direction of the axis and entering the recess, and
a space between the projection and the recess is the labyrinth gap.

* * * * *